United States Patent [19]
Schiferl et al.

[11] Patent Number: 6,157,109
[45] Date of Patent: Dec. 5, 2000

[54] DYNAMOELECTRIC MACHINE WITH FERROMAGNETIC END WINDING RING

[75] Inventors: Rich F. Schiferl, Euclid; Boris A. Shoykhet, Beachwood, both of Ohio

[73] Assignee: Reliance Electric Technologies, LLC, Thousand Oaks, Calif.

[21] Appl. No.: 09/021,204

[22] Filed: Feb. 10, 1998

[51] Int. Cl.[7] .............................. H02K 1/12; H02K 1/06; H02K 3/00; H02K 3/38; H02K 3/42

[52] U.S. Cl. ..................... 310/254; 310/216; 310/261; 310/256; 310/260; 310/270

[58] Field of Search ............................. 310/43, 256, 216, 310/260, 261, 254, 270, 211

[56] References Cited

U.S. PATENT DOCUMENTS

| | | | |
|---|---|---|---|
| Re. 34,667 | 7/1994 | Neumann | 310/216 |
| 911,081 | 2/1909 | Smoot et al. | 310/260 |
| 3,100,271 | 8/1963 | Darrieus et al. | 310/256 |
| 3,335,308 | 8/1967 | Robinson | 310/211 |
| 3,634,709 | 1/1972 | Le Henaff | 310/214 |
| 3,691,416 | 9/1972 | Drexler et al. | 310/270 |
| 3,924,149 | 12/1975 | Estrada et al. | 310/260 |
| 3,953,754 | 4/1976 | Hallerback | 310/259 |
| 4,013,910 | 3/1977 | Deming | 310/211 |
| 4,054,809 | 10/1977 | Jefferies | 310/256 |
| 4,088,913 | 5/1978 | Prigorovsky et al. | 310/260 |
| 4,129,796 | 12/1978 | Papst | 310/43 |
| 4,225,800 | 9/1980 | Magnaghi | 310/260 |
| 4,254,352 | 3/1981 | Fidei et al. | 310/71 |
| 4,291,249 | 9/1981 | Smith, Jr. et al. | 310/258 |
| 4,358,692 | 11/1982 | Hallerback | 310/42 |
| 4,368,399 | 1/1983 | Ying et al. | 310/270 |
| 4,488,077 | 12/1984 | Kovacs | 310/211 |
| 4,525,642 | 6/1985 | Humphries et al. | 310/260 |
| 4,528,473 | 7/1985 | Tezuka | 310/256 |
| 4,581,554 | 4/1986 | Decesare | 310/260 |
| 4,598,223 | 7/1986 | Glennon et al. | 310/260 |
| 4,943,749 | 7/1990 | Ponce et al. | 310/260 |
| 5,097,166 | 3/1992 | Mikulic | 310/156 |
| 5,117,138 | 5/1992 | Trian | 310/89 |
| 5,194,775 | 3/1993 | Cooper | 310/260 |
| 5,368,399 | 11/1994 | Tremblay | 384/583 |
| 5,373,211 | 12/1994 | Ramirez-Coronel et al. | 310/260 |
| 5,485,050 | 1/1996 | Zimmermann | 310/260 |
| 5,514,923 | 5/1996 | Gossler et al. | 310/74 |
| 5,583,388 | 12/1996 | Paroz et al. | 310/260 |
| 5,635,785 | 6/1997 | Schwanda et al. | 310/270 |
| 5,637,945 | 6/1997 | Yamamuro et al. | 310/268 |

OTHER PUBLICATIONS

"Development Status of a 125 Horsepower Superconducting Motor" by Rich Schiferl et al.; presented at Cryogenic Engineering Conference and International Cryogenic Materials Conference (CEC/ICMC), Columbus, Ohio, Jul. 18, 1995.

"High Temperature Superconductivity Applied to Electric Motors" by J. D. Edick, R. F. Schiferl, and H. E. Jordan, IEEE Dec. 1992, vol. 2, No. 4, pp. 189–194.

*Primary Examiner*—Clayton LaBalle
*Attorney, Agent, or Firm*—Himanshu S. Amin; John J. Horn; William R. Walbrun

[57] ABSTRACT

A dynamoelectric machine such as a motor or generator has an end winding ring of ferromagnetic material in an area of the end winding portions of the stator and/or rotor winding. The end winding ring improves the overall power density of the motor by reducing the stator and/or rotor flux leakage (the magnetic flux that is produced by the windings that is not utilized to produce torque in the rotor). By operatively coupling end winding portions of the stator winding with ferromagnetic material, the end winding portion is employed to produce torque in the rotor. The end winding ring may be a ring of ferromagnetic material attached to the stator core or the frame or the rotor, or may be a coating of ferromagnetic material applied indirectly to the end winding portions. The end winding ring also may support the end winding portions to reduce movement thereof.

25 Claims, 9 Drawing Sheets ns, for example, are induced
DYNAMOELECTRIC MACHINE WITH FERROMAGNETIC END WINDING RING

TECHNICAL FIELD

The present invention generally relates to dynamoelectric machines with stator and/or rotor windings having end winding turns. In particular, the present invention relates to ferromagnetic material operatively coupled with end windings of a dynamoelectric machine to provide improved output as well as support for the end windings.

BACKGROUND OF THE INVENTION

Dynamoelectric machines, such as motors and generators, are employed in a wide variety of industrial and commercial applications. Some types of motors employ a stator to set up a magnetic field which produces a rotational torque in current-carrying conductors of a rotor, causing the rotor to rotate. This rotation of the rotor is used to perform work.

Motors which run on alternating current, such as induction motors, typically employ an electromagnetic stator which includes a core of ferromagnetic material and windings of wire embedded in slots in the core. Energizing the stator by running an AC current through the windings produces a magnetic field in the vicinity of the stator. Turbine generators may also utilize a core of ferromagnetic material with windings of wire embedded in slots in the core.

Problems arise in motor design due to the necessity for the windings to have end turn portions which connect the embedded portions of different slots. These end winding portions are a source of stator flux leakage, (i.e., magnetic flux that is produced by the windings that is not utilized to produce a torque in the rotor). This stator flux leakage reduces efficiency of motors or other electric machines having such end winding portions. It will be appreciated that it is highly desirable to achieve improvements in the efficiency of dynamo-electric machines.

Prior attempts have been made to reduce stator flux leakage by designing the slots in the stator core to make the end winding turns smaller. Such designs attack the problem of stator flux leakage by making the non-productive region of the windings smaller, but do not provide for making the end winding turns productive for producing torque to turn the rotor.

Another problem arising from the necessity for end winding turns is that the turns are subject to electrodynamic and mechanical forces that tend to displace the end windings relative to the stator. Electric,dynamic forces causing displacement of the turns in a motor, for example, are induced by large currents passing through the coils during starting and peak load conditions. Mechanical forces are caused by normal mechanical vibrations developed due to rotation of the parts of the motor during operation. It has long been recognized that such displacement of the end turns has an undesirable effect of destroying the winding insulation in the end turns, leading to premature failure of the motor. Accordingly, numerous methods have been employed in the prior art for securing the end winding turns against movement relative to the stator. However, these conventional methods do not address the problem of stator flux leakage, but rather are simply directed to securing the end windings.

From the foregoing it can be appreciated that there is a need for a dynamoelectric machine having reduced stator flux leakage, and which makes more productive use of the end turns of the windings. It would further be desirable for the end winding turns to be supported to limit their displacement relative to the stator.

SUMMARY OF THE INVENTION

The present invention provides for a dynamoelectric machine such as a motor or generator with an end winding ring of ferromagnetic material in the area of the end winding portions of the stator winding and/or the rotor winding. The end winding ring improves the overall power density of the motor by reducing stator and/or rotor flux leakage (the magnetic flux that is produced by the windings that is not utilized to produce torque in the rotor). By operatively coupling the end winding portions of the stator winding with ferromagnetic material, this conventionally non-productive portion of the stator winding is employed to produce torque in the rotor. The end winding ring may actually be a ring of ferromagnetic material attached to the stator core or the frame, or may be a coating of ferromagnetic material applied directly to the end winding portions. The end winding ring may also have the advantage of supporting the end winding portions to reduce movement thereof.

According to one specific aspect of the invention, a dynamoelectric machine includes a stator core, a stator winding at least partially distributed on the stator core, the stator winding having stator end portions not distributed on the stator core, and first ferromagnetic material operatively coupled to the stator end portions to make use of flux generated by the end portions to facilitate rotation of a rotor.

According to another aspect of the invention, a method of reducing stator flux leakage from a dynamoelectric machine, includes the steps of: producing a magnetic field from end portions of a stator winding by operatively coupling magnetic material to the end portions; and using the magnetic field to enhance rotation of a rotor adapted to produce torque in response to the magnetic field.

According to a yet another aspect of the invention, a dynamoelectric machine includes a stator core comprising a plurality of laminates made out of a ferromagnetic material; a stator winding at least partially distributed on the stator core, the stator winding having end portions not distributed on the stator core; an end winding ring comprising a plurality of laminates of the ferromagnetic material, the end winding ring operatively coupled to the end portions to generate a magnetic field; and a rotor having a cylindrical active portion operatively engaged with the magnetic field to produce torque in the rotor.

According to a further aspect of the invention, a dynamoelectric machine includes a stator core; a rotor; a stator winding having a portion at least partially distributed on the stator core, the stator winding also having stator end portions not distributed on the stator core; and first ferromagnetic material proximate to the stator end portions such that flux generated by the end portions facilitates rotation of the role:or.

In accordance with yet another aspect of the invention, a dynamoelectric machine is provided which comprises: a rotor back iron including a ferromagnetic material which is operatively coupled to at least part of an active portion of a rotor to facilitate rotation of the rotor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
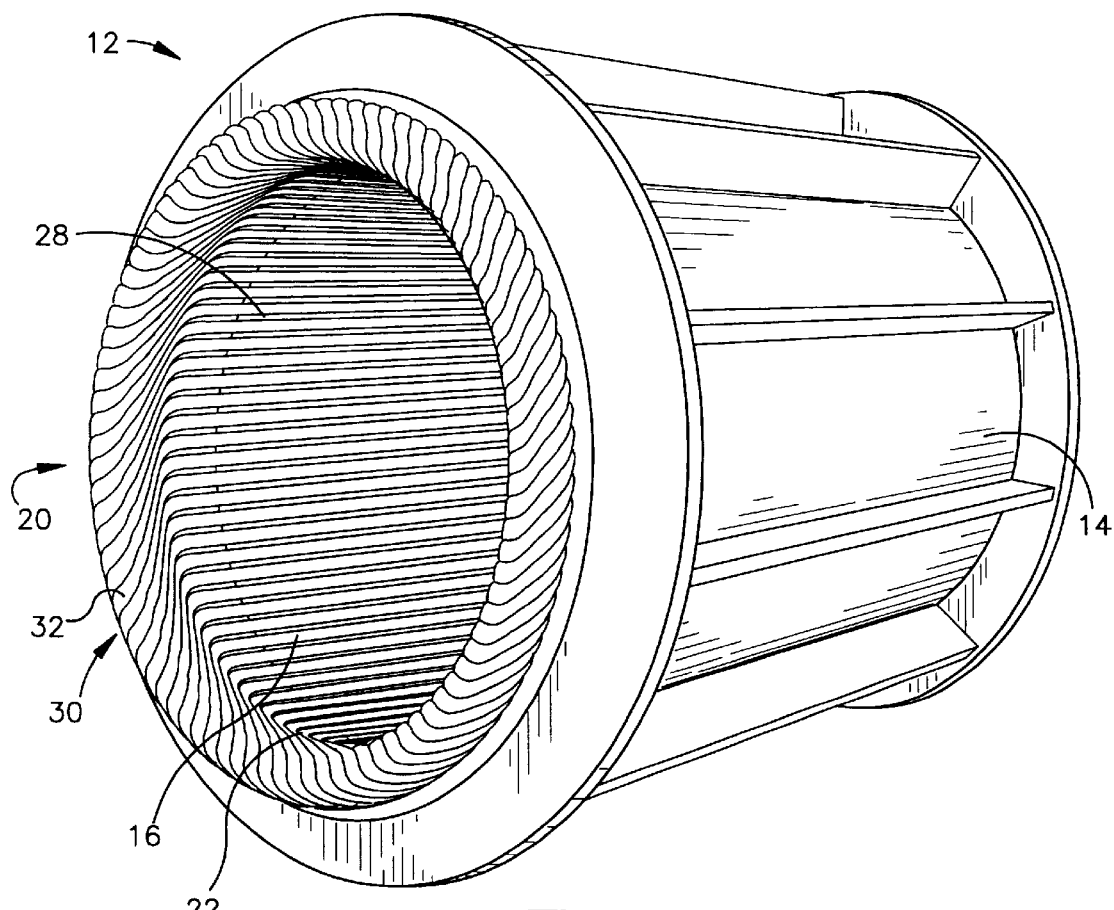
FIG. 1 is a perspective view of a prior art stator of a dynamoelectric machine.

The present invention will now be described with reference to the drawings, wherein like reference numerals are used to refer to like elements throughout.

Figure 2:
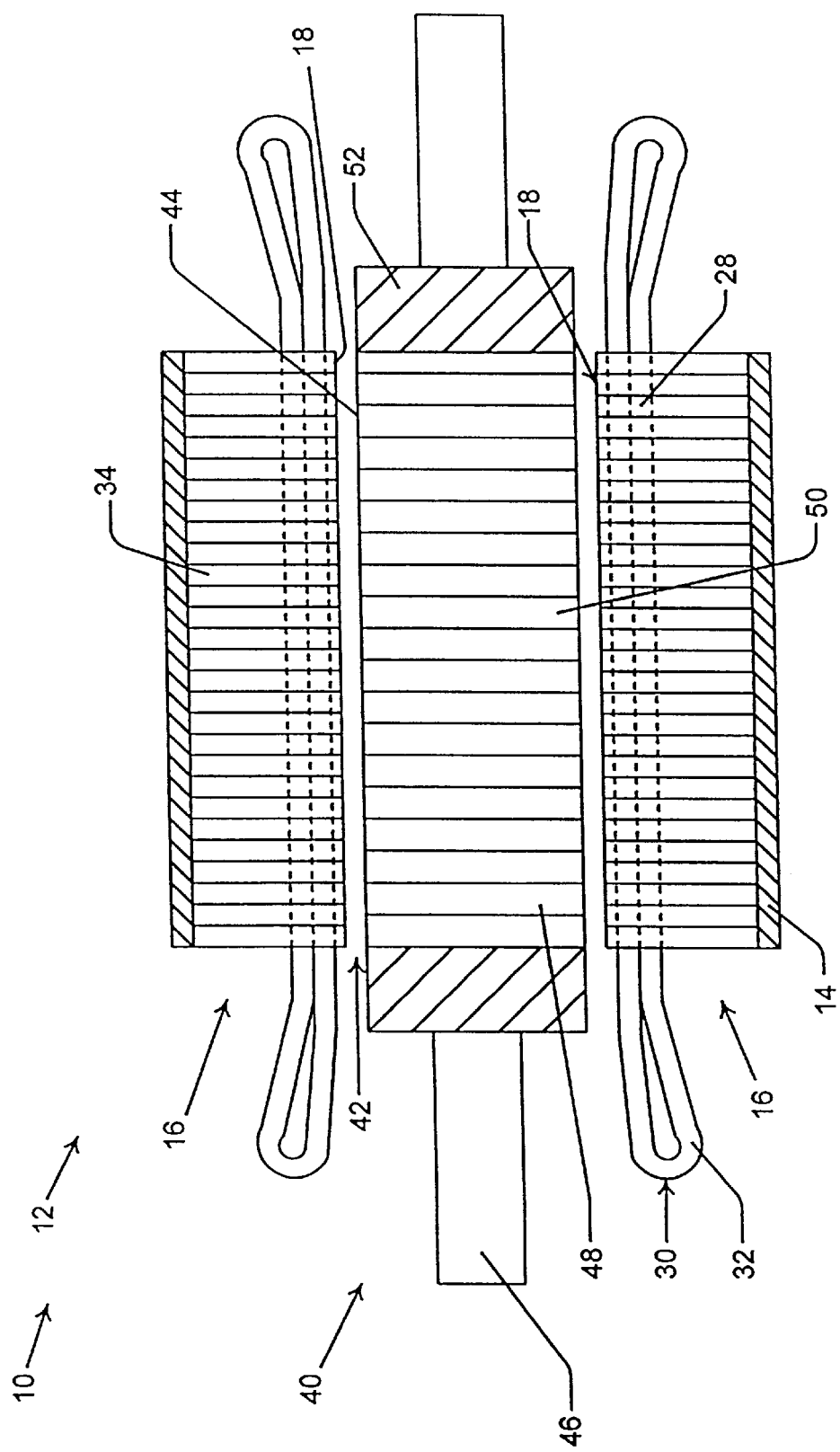
FIG. 2 is a side sectional view of the stator of FIG. 1 with a rotor disposed therein.

Referring initially to FIGS. 1 and 2, a typical dynamoelectric machine (e.g., an AC induction motor, AC generator, AC synchronous motor or AC synchronous generator) 10 is shown. The dynamoelectric machine 10 as shown in FIG. 2 has a stator assembly 12 (shown in perspective in FIG. 1), which includes a frame 14 and a cylindrically-shaped stator core 16, the core 16 having an inner surface 18 which defines a bore 20 therein. The core 16 is mounted in a fixed position within the frame 14 by any suitable means, such as by clamping the stator core 16 between interior ribs (not shown) of the frame 14. The stator core 16 is typically made of a ferromagnetic material such as iron, cobalt, nickel, or an alloy thereof. As is typical, the stator core 16 includes a plurality of longitudinal slots 22 at arcuately spaced-apart points around its inner circumference. Each of the slots 22 is adapted to receive two embedded portions 28 of a stator winding 30. The winding 30 also includes end winding portions 32 outside of the slots 22 and beyond the ends of the core 16, the end winding portions 32 electrically connecting together the embedded portions 28 from different slots in a suitable conventional manner. It will be appreciated that all of the end winding portions 32 are substantially similar in form.

It will be appreciated that alternatively the stator winding 30 may be otherwise at least partially distributed on the stator core 16 with the end winding portions 32 not distributed on the stator core 16.

The stator core 16 is comprised of a plurality of laminated sheets ("stator laminations") 34 of ferromagnetic material such as iron, cobalt, nickel, or an alloy thereof. Laminated sheets are used in the stator core 16 to control eddy currents therein in order to avoid heating of the stator core 16 which could lead to melting of the ferromagnetic material.

As shown in FIG. 2, a rotor 40 is centrally located in the bore 20, with the axis of the rotor 40 being coincident with the axis of the bore 20. An air gap 42 between the rotor 40 and the stator core 16 is defined by an outer surface 44 of the rotor 40 and the inner surface 18 of the stator core 16. The rotor 40 is suitably axially fixed by means of a shaft 46, which is supported by bearings (not shown). The rotor 40 has an active portion 48 which preferably comprises a stack of rotor laminations 50 capped at its ends by end rings 52. The rotor laminations 50 typically have rotor slots (not shown) along their peripheries, the rotor slots being filled with a conductive material (not shown) such as copper or aluminum. The conductive material in the rotor slots is short circuited by means of the end rings 52, which are also made of a conductive material.

It is to be appreciated that alternatively, the rotor itself may have windings located thereon.

In operation of the dynamoelectric machine 10, current is passed through the winding 30, thereby creating a magnetic field in the bore 20 which is intensified by the ferromagnetic material in the core 16. This magnetic field reacts with the conductors of the rotor 40 to produce a torque which turns the rotor 40.

In the dynamoelectric machine 10 of FIGS. 1 and 2, the end winding portions 32 are a source of stator flux leakage, that is, magnetic flux produced by the stator winding 30 does not interact with the rotor 40, and thus does not produce a torque in the rotor 40. The flux in the end winding portions 32 produces a magnetic field; however, there is no ferromagnetic material in the vicinity of the end winding portions 32 to intensify the field. Further, the field produced by the end winding portions 32 does not produce a torque in the rotor 40 because the active portion 48 of the rotor 40 does not extend to the vicinity of the end winding portions 32.

Figure 3:
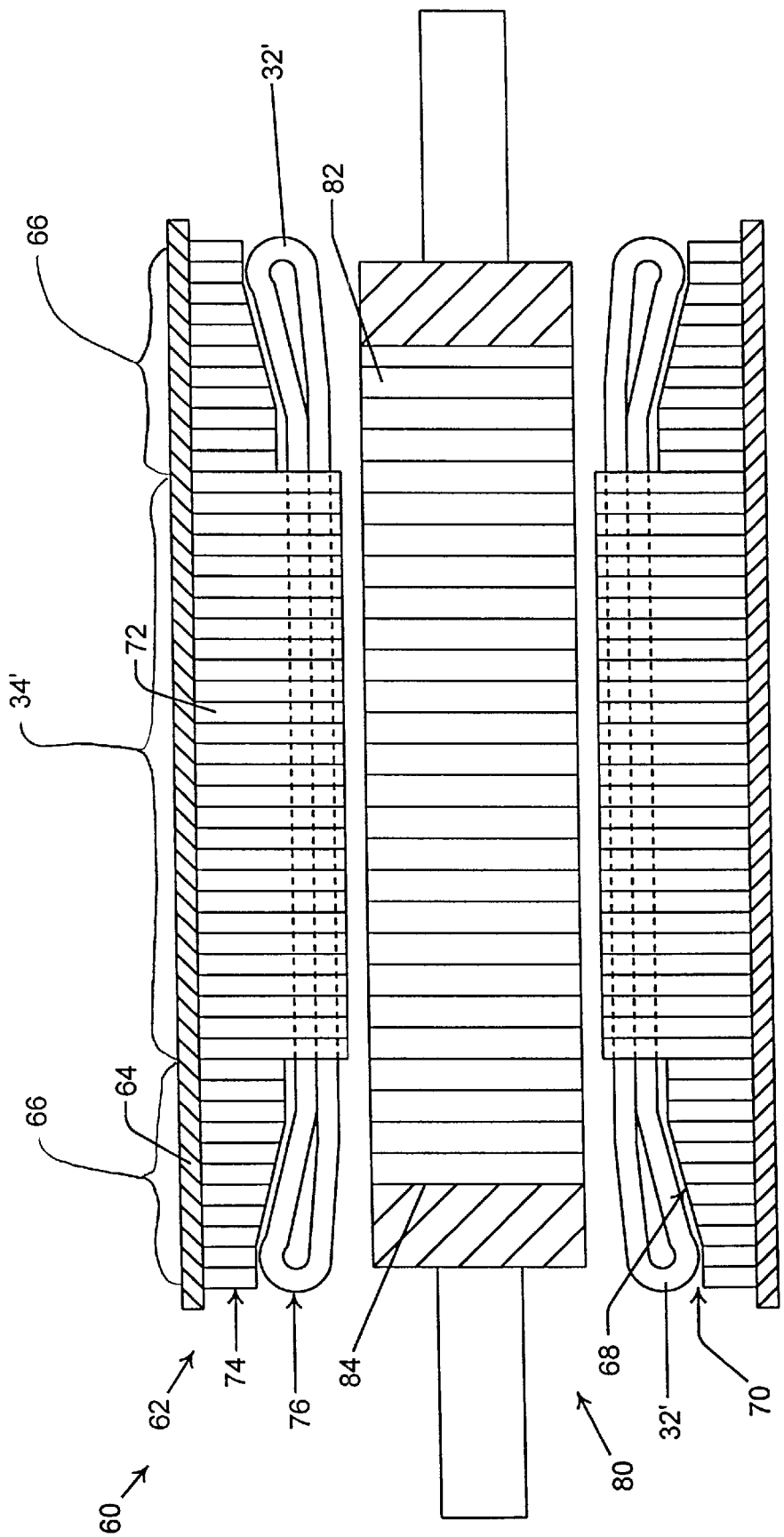
FIG. 3 is a side sectional view of a stator and rotor of the present invention.

FIG. 3 illustrates a dynamoelectric machine (e.g., a motor) 60, in accordance with the present invention. Like parts between the motor 10 and the motor 60 include like reference numerals, and further discussion relating thereto is limited for sake of brevity. A stator assembly 62 of the motor 60 has a frame 64 which extends so that end winding portions 32' are within the ends of the frame 64. An end winding ring 66 of ferromagnetic material is provided in the vicinity of each of the end winding portions 32'. The ring 66 allows a more intense magnetic field to be produced in the vicinity of the end winding portions 32'. An inner surface 68 of the ring 66 is preferably located as close as possible to the end winding portions 32', such that the ring-winding gap 70 is small. Although the ring 66 is preferably formed as a single unit with stator laminations 34' to form a stator core 72, the ring 66 may be formed as a separate part. Although an end face 74 of the ring 66 is shown at the same longitudinal location as a distal end 76 of the winding portions 32', it will be appreciated that the end face 74 of the ring 66 may be at another longitudinal location, provided that the ring 66 allows a more intense magnetic field to be produced in the vicinity of the end winding portions 32'. While the ring 66 is preferably made of the same ferromagnetic material as the stator laminations 34', the ring 66 and the stator laminations 34' may be made of different suitable ferromagnetic materials. The ring 66 preferably includes laminations of ferromagnetic material.

It will be appreciated that the end winding portions 32' may be supported by the ring 66. For example, cords (not shown) may be used to tie the end winding portions 32' to the ring 66. Use of binding cords to secure end winding turns is shown in U.S. Pat. No. 4,088,913, to Prigorovsky et al., entitled ELECTRICAL MACHINE STATOR, which is hereby incorporated in its entirety by reference. Alternatively or in addition, a compressible pad (not shown) may be inserted in the ring-winding gap 70 which would provide steady pressure on the end winding portions 32' so as to damp their movement. Use of a compressible pad to secure end winding turns is shown in U.S. Pat. No. 3,924,149, to Estrada et al., entitled TIELESS BRACING AND METHOD FOR SUPPORTING END TURNS OF A DYNAMOELECTRIC MACHINE, which is hereby incorporated in its entirety by reference.

The motor 60 employs a rotor 80 having an active portion 82 which is longer in a longitudinal (axial) direction as compared with the active portion 48 of the rotor 40 of the motor 10. An end face 84 of the active portion 82 is preferably located at a longitudinal location whereby the active portion 82 attains the maximum effect of the magnetic field created by the ring 66 and the stator core 72. Thus the end face 84 of the active portion 82 may not necessarily be at the same longitudinal location as the distal end 76 of the winding portions 32' or the end face 74 of the ring 66.

Although the stator core 72 has heretofore been described as generally comprising laminates of ferromagnetic material, it will be appreciated that the stator core may be formed out of a non-laminated material or materials, and may comprise non-ferromagnetic material. For example, the stator core material may comprise air, with suitable supports provided for the stator winding.

Figure 4:
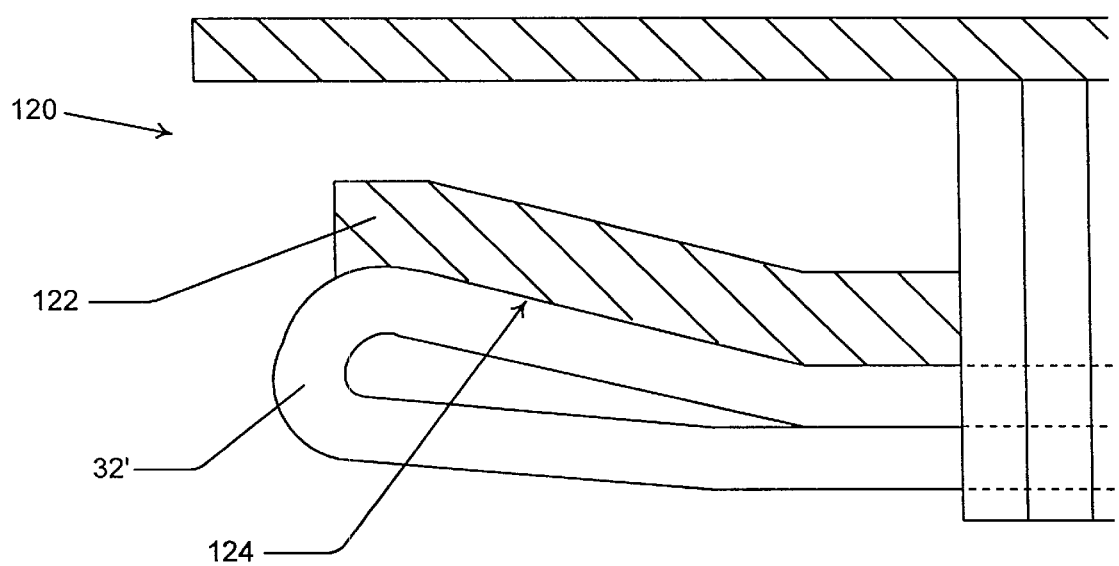
FIG. 4 shows a side sectional view of an another embodiment of the present invention which has a coating of a ferromagnetic material applied directly to the end winding portions.

FIG. 4 depicts an alternate aspect of the present invention wherein a stator 120 includes a coating 122 of ferromagnetic material provided directly on a radially outer surface 124 of the end winding portions 32'. The coating 122 serves the same general purposes as the ring 66: it increases magnetic flux in the area of the end winding portions 32', and it provides support to help keep the end winding portions 32' from being displaced.

Figure 5:
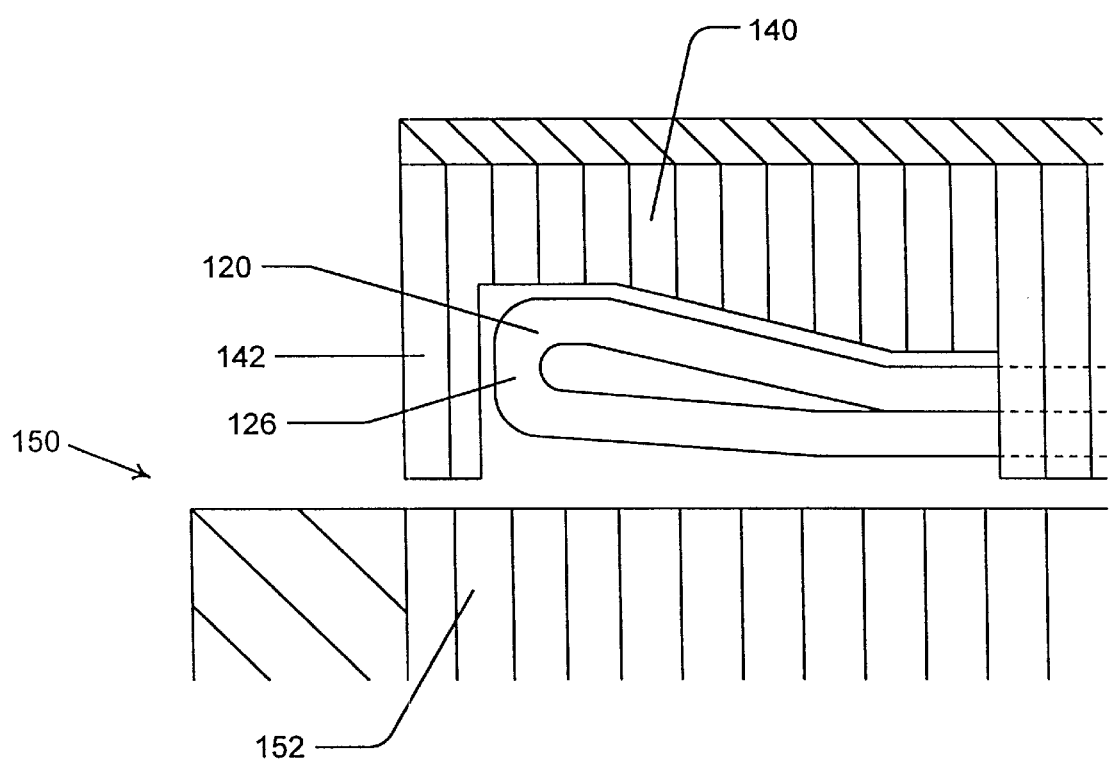
FIG. 5 is a side sectional view of an alternate embodiment of the present invention having an end winding ring of ferromagnetic material which substantially surrounds the end winding portions.

FIG. 5 shows an alternate embodiment of the present invention having an end winding ring 140 of ferromagnetic material which more completely surrounds the end winding portions 120. The ring 140 has an outer conducting ring 142 which is substantially parallel to the face section 126 of the end winding portions 120. The conducting ring 142 further reduces stator flux leakage from the end winding portions 120 by more completely surrounding the end winding portions 120. Although the conducting ring 142 is preferably made of a ferromagnetic material, it may be made of any suitable electrically conducting material. A rotor 1 50 having a further-extended active region 1 52 is employed to facilitate utilizing magnetic flux from the end winding region.

Figure 6:
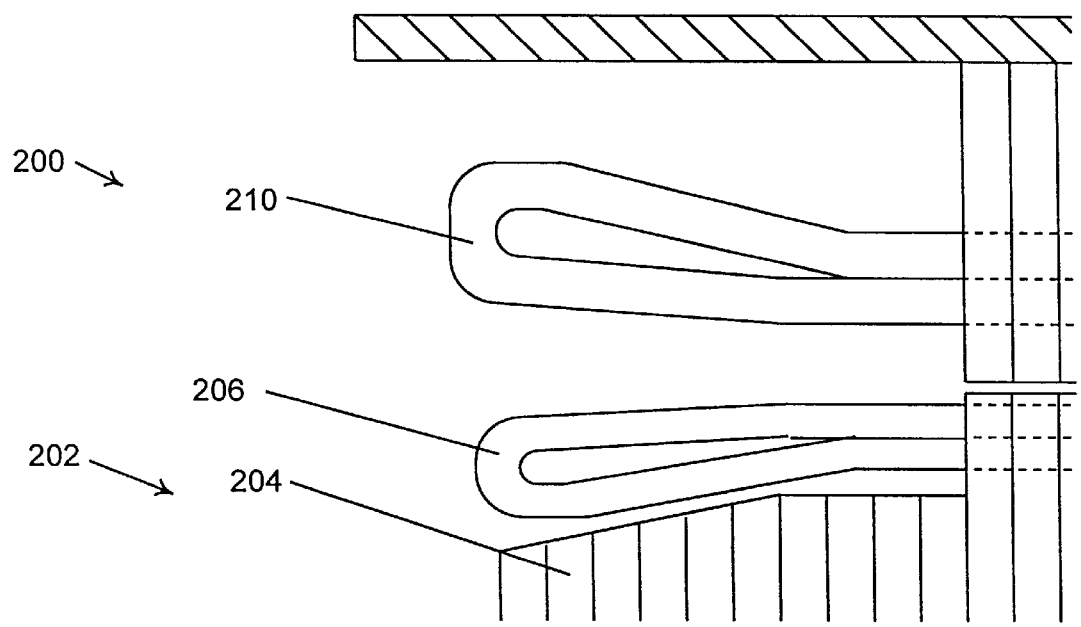
FIG. 6 is a side sectional view of an alternative embodiment of the invention having a rotor back iron ring of ferromagnetic material behind a rotor end winding portion.
Figure 7:
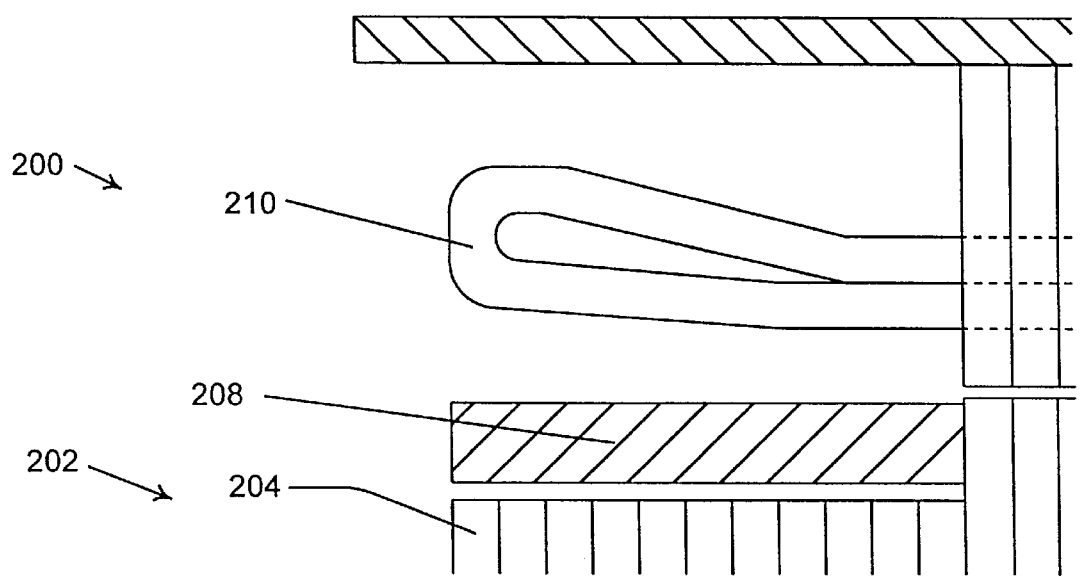
FIG. 7 is a side sectional view of an alternative embodiment of the invention having a rotor back iron ring of ferromagnetic material behind a rotor end ring.

FIGS. 6 and 7 show alternate aspects of the invention wherein a dynamoelectric machine 200 includes a rotor 202 with a back iron ring 204 of ferromagnetic material placed behind rotor end winding portions 206 (FIG. 6) or rotor end ring 208 (FIG. 7). The dynamoelectric machine 200 may be, for example, an induction motor, a synchronous motor, or a super-conductor motor. The ring 204 allows a more intense magnetic field to be produced in the vicinity of the rotor end winding portions 206 or the end ring 208 and stator end winding portions 210. It will be appreciated that the ring 204 may also support the rotor end winding portions 206 by limiting their displacement.

Figure 8:
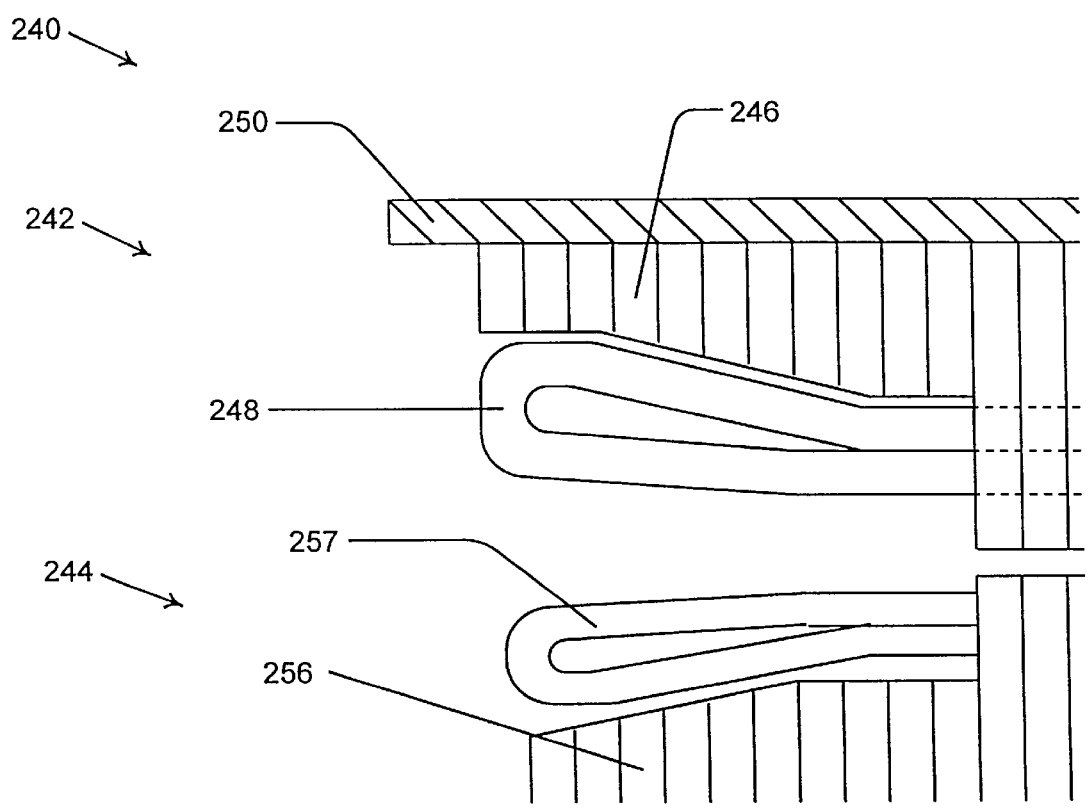
FIG. 8 is a side sectional view of an alternative embodiment of the invention having both a stator end winding ring and a rotor back iron ring behind a rotor end winding portion.
Figure 9:
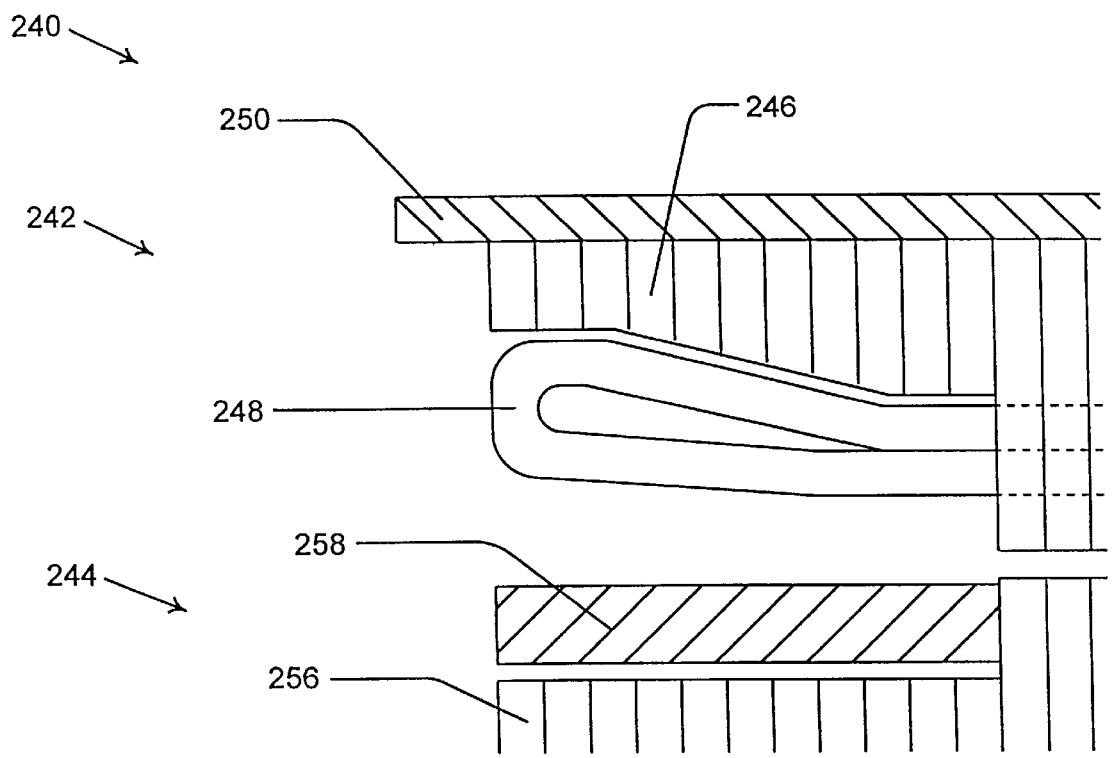
FIG. 9 is a side sectional view of an alternative embodiment of the invention having both a stator end winding ring and a rotor back iron ring behind a rotor end ring.

FIGS. 8 and 9 depict alternate embodiments of the invention wherein a dynamoelectric machine 240 includes a stator 242 and a rotor 244 both having rings of ferromagnetic material. The stator 242 has an end winding ring 246 of ferromagnetic material between end winding portions 248 and a stator frame 250. The rotor 244 has a back iron ring 256 of ferromagnetic material placed behind end winding portions 257 (FIG. 8) or end ring 258 (FIG. 9). The dynamoelectric machine 240 may be, for example, an induction motor or a synchronous motor. The rings 246 and 256 allow a more intense magnetic field to be produced in the vicinity of the end winding portions 248 and the end winding portions 257 cry the end ring 258. The rings 246 and 256 may also support respective end winding portions 248 and 258 by limiting their displacement.

It will be appreciated that although the present invention has been described herein with respect to motors, the invention may also be employed in generators or other dynamoelectric machines which employ stators and/or rotors comprising a core of material with windings of wire.

Thus, the present invention provides for making productive use of the end winding portions of the stator and/or rotor windings of a dynamoelectric machine. By operatively coupling ferromagnetic material with these end winding portions, productive use of the magnetic flux produced by the end winding portions is made. As a result, the present invention provides for a dynamoelectric machine having increased torque. Furthermore, the ferromagnetic material provides for supporting the end winding portions and thus facilitating reducing displacement thereof.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A dynamoelectric machine comprising:

a stator core;

a stator winding at least partially distributed on the stator core, the stator winding having stator end portions not distributed on the stator core, at least one of the stator end portions including an angled portion and a rounded end connected to the angled portion; and first ferromagnetic material operatively coupled to the stator end portions to make use of flux generated by the end portions to facilitate rotation of a rotor, the first ferromagnetic material having at least one angled portion extending along the angled portion of the at least one of the stator end portions and at least one straight portion extending along the rounded end of the at least one of the stator end portions.

2. The machine of claim 1, wherein the stator core comprises a plurality of laminates made out of a second ferromagnetic material.

3. The machine of claim 2, wherein the first ferromagnetic material comprises a ring.

4. The machine of claim 3, wherein the ring comprises a plurality of laminates.

5. The machine of claim 4, wherein the ring and the stator core are formed as a single unit.

6. The machine of claim 1, wherein the first ferromagnetic material is coated on the stator end portions.

7. The machine of claim 1, wherein the rotor has a cylindrical active portion which is responsive to a magnetic field, thereby producing a torque in the rotor, wherein the active portion is operatively coupled to the end portions of the stator winding.

8. The machine of claim 7, further comprising a rotor back iron including a second ferromagnetic material which is operatively coupled to at least part of the active portion of the rotor.

9. The machine of claim 8, wherein the first ferromagnetic material comprises a first ring, the first ring being further from the rotor than the stator end portions.

10. The machine of claim 8, wherein the at least part of the active portion of the rotor comprises a rotor end ring.

11. The machine of claim 8, wherein the at least part of the active portion of the rotor comprises a rotor end winding portion.

12. The machine of claim 1, wherein the first ferromagnetic material prevents displacement of the stator end portions relative to the stator core.

13. The machine of claim 12, wherein the first ferromagnetic material is in contact with the stator end portions.

14. A dynamoelectric machine comprising:

a stator core;

a stator winding at least partially distributed on the stator core, the stator winding having stator end portions not distributed on the stator core;

first ferromagnetic material operatively coupled to the stator end portions to make use of flux generated by the end portions to facilitate rotation of a rotor; and an outer conducting ring attached to the first ferromagnetic material, the outer conducting ring being further from the stator core than the stator end portions.

15. The machine of claim 1, wherein the stator core comprises a non-ferromagnetic material.

16. A method of reducing stator flux leakage from a dynamoelectric machine, comprising the steps of:

producing a magnetic field from end portions of a stator winding by operatively coupling magnetic material to the end portions, at least one of the end portions including an angled portion and a rounded end connected to the angled portion and the first magnetic material having at least one angled portion extending along the angled portion of the at least one of the end portions and at least one straight portion extending along the rounded end of the at least one of the end portions; and using the magnetic field to enhance rotation of a rotor adapted to produce torque in response to the magnetic field.

17. The method of claim 16, further including the step of placing a ring of magnetic material in an area of the end portions.

18. A method of reducing stator flux leakage from a dynamoelectric machine, comprising the steps of:

producing a magnetic field from end portions of a stator winding by operatively coupling magnetic material to the end portions; and using the magnetic field to enhance rotation of a rotor adapted to produce torque in response to the magnetic field, wherein the step of operatively coupling the magnetic material to the end portion includes a step of putting a coating of magnetic material on the end portions.

19. A dynamoelectric machine comprising:

a stator, including:

end winding portions having a coating of ferromagnetic material, the coating increasing magnetic flux in an area of the end winding portions.

20. A dynamoelectric machine comprising:

a stator core;

a rotor;

a stator winding having a portion at least partially distributed on the stator core, the stator winding also having stator end portions not distributed on the stator core, at least one of the stator end portions including an angled portion and a rounded end connected to the angled portion; and first ferromagnetic material proximate to the stator end portions such that flux generated by the end portions facilitates rotation of the rotor, the first ferromagnetic material having at least one angled portion extending along the angled portion of the at least one of the stator end portions and at least one straight portion extending alone the rounded end of the at least one of the stator end portions.

21. The machine of claim 20, wherein the stator core has a plurality of slots and the portion of the stator winding at least partially distributed on the stator core is in the slots.

22. The machine of claim 21, wherein the first ferromagnetic material comprises a ring attached to the stator core.

23. The machine of claim 22, wherein the ring comprises a plurality of laminates of ferromagnetic material.

24. A dynamoelectric machine comprising:

a stator core;

a rotor;

a stator winding having a portion at least partially distributed on the stator core, the stator winding also having stator end portions not distributed on the stator core; and first ferromagnetic material proximate to the stator end portions such that flux generated by the end portions facilitates rotation of the rotor, wherein the first ferromagnetic material comprises a coating of ferromagnetic material on the stator end portions.

25. The machine of claim 20, wherein the stator core comprises a non-ferromagnetic material.

* * * * *